(12) United States Patent
Hong et al.

(10) Patent No.: US 12,493,401 B2
(45) Date of Patent: Dec. 9, 2025

(54) AUTOMATED MOODBOARD AUGMENTATION VIA CROSS-MODAL GENERATIVE ASSOCIATION MAKING

(71) Applicant: TOYOTA RESEARCH INSTITUTE, INC., Los Altos, CA (US)

(72) Inventors: Matthew Kyung-Soo Hong, Mountain View, CA (US); Shabnam Hakimi, San Francisco, CA (US); Yin-Ying Chen, San Jose, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 177 days.

(21) Appl. No.: 18/404,783

(22) Filed: Jan. 4, 2024

(65) Prior Publication Data

US 2025/0224861 A1   Jul. 10, 2025

(51) Int. Cl.
*G06F 3/0482* (2013.01)
*G06F 3/04845* (2022.01)
*G06F 3/04847* (2022.01)

(52) U.S. Cl.
CPC ........ *G06F 3/04845* (2013.01); *G06F 3/0482* (2013.01); *G06F 3/04847* (2013.01)

(58) Field of Classification Search
CPC ................................................ G06F 3/048–05
See application file for complete search history.

(56) References Cited

U.S. PATENT DOCUMENTS

| | | | |
|---|---|---|---|
| 12,153,783 B2* | 11/2024 | Hellsten | G06F 3/04845 |
| 2007/0288453 A1* | 12/2007 | Podilchuk | G06F 16/5854 |
| | | | 707/999.005 |
| 2015/0331580 A1* | 11/2015 | Dirsa | G06Q 30/0643 |
| | | | 715/744 |
| 2018/0349447 A1* | 12/2018 | Maccartney | G06F 16/24578 |
| 2020/0242774 A1* | 7/2020 | Park | G06N 3/084 |

(Continued)

FOREIGN PATENT DOCUMENTS

| | | |
|---|---|---|
| CN | 112381707 A | 2/2021 |
| WO | 2023067603 A1 | 4/2023 |

OTHER PUBLICATIONS

Danchenko, Ekaterina, "The AI-teration Method and the Role of AI in Architectural Design," FTC 2020, AISC 1288, pp. 525-538, 2021.

(Continued)

*Primary Examiner* — Daniel Rodriguez
(74) *Attorney, Agent, or Firm* — SEYFARTH SHAW LLP

(57) ABSTRACT

A method for automated moodboard augmentation via cross-modal generative association making is described. The method includes specifying, by a user, a region to augment in their digital workspace, including at least one selected image. The method also includes inferring a representative text, label, or description for the at least one selected image. The method further includes creating a basis for concept blending based on the representative text, label, or description inferred for the at least one selected image. The method also includes generating images in response to an adjustable slider, as adjusted by the user, to adjust how much the generated images should resemble directly adjacent images, including the at least one selected image.

20 Claims, 8 Drawing Sheets

(56) References Cited

U.S. PATENT DOCUMENTS

| | | |
|---|---|---|
| 2023/0051832 A1 | 2/2023 | Shin et al. |
| 2023/0386114 A1* | 11/2023 | Kumar .................. G06N 3/088 |
| 2024/0127411 A1* | 4/2024 | Lin ........................ G06T 5/77 |
| 2024/0361891 A1* | 10/2024 | Bagnall ............... G06F 3/04845 |
| 2025/0104305 A1* | 3/2025 | Tagra ..................... G06T 11/60 |
| 2025/0111630 A1* | 4/2025 | Chen ..................... G06T 19/20 |
| 2025/0117126 A1* | 4/2025 | Kale .................. G06F 3/04845 |

OTHER PUBLICATIONS

Wan, Qian, "GANCollage: A GAN-Driven Digital Mood Board to Facilitate Ideation in Creativity Support," DIS '23, Jul. 10-14, 2023, Pittsburgh, PA, USA.

* cited by examiner

AUTOMATED MOODBOARD AUGMENTATION VIA CROSS-MODAL GENERATIVE ASSOCIATION MAKING

BACKGROUND

Field

Certain aspects of the present disclosure generally relate to machine assisted design and, more particularly, to a system and method for automated moodboard augmentation via cross-modal generative association making.

Background

Visual content creators may utilize image curation tools to provide an online platform for creating and highlighting their creative work. For example, image curation tools such as PINTEREST® and BEHANCE® are the de facto standard tools used by designers to inspire their work. Nevertheless, exploring a design space involves a manual and aimless process, which is not provided by these image creation tools. In practice, visual content creators first begin their creative process (e.g., concept sketches) by aimlessly searching or scrolling through images in diverse topics (e.g., fashion, architecture, product design, etc.). This searching/scrolling process is followed by iteratively narrowing down the topic, scope, and focus of the search as the visual content creators increase the fidelity of their designs.

A visual content creation tool for stimulating people's creative ideation process by adding interactive and augmentative capabilities to an image-based digital moodboard interface, is desired.

SUMMARY

A method for automated moodboard augmentation via cross-modal generative association making is described. The method includes specifying, by a user, a region to augment in their digital workspace, including at least one selected image. The method also includes inferring a representative text, label, or description for the at least one selected image. The method further includes creating a basis for concept blending based on the representative text, label, or description inferred for the at least one selected image. The method also includes generating images in response to an adjustable slider, as adjusted by the user, to adjust how much the generated images should resemble directly adjacent images, including the at least one selected image.

A non-transitory computer-readable medium having program code recorded thereon for automated moodboard augmentation via cross-modal generative association making is described. The program code being is executed by a processor. The non-transitory computer-readable medium includes program code to specify, by a user, a region to augment in their digital workspace, including at least one selected image. The non-transitory computer-readable medium also includes program code to infer a representative text, label, or description for the at least one selected image. The non-transitory computer-readable medium further includes program code to create a basis for concept blending based on the representative text, label, or description inferred for the at least one selected image. The non-transitory computer-readable medium also includes program code to generate images in response to an adjustable slider, as adjusted by the user, to adjust how much the generated images should resemble directly adjacent images, including the at least one selected image.

A system for automated moodboard augmentation via cross-modal generative association making is described. The system includes a region/image selection module to specify, by a user, a region to augment in their digital workspace, including at least one selected image. The system also includes an image description inference model to infer a representative text, label, or description for the at least one selected image. The system further includes a concept blending module to create a basis for concept blending based on the representative text, label, or description inferred for the at least one selected image. The system also includes an image generation module to generate images in response to an adjustable slider, as adjusted by the user, to adjust how much the generated images should resemble directly adjacent images, including the at least one selected image.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
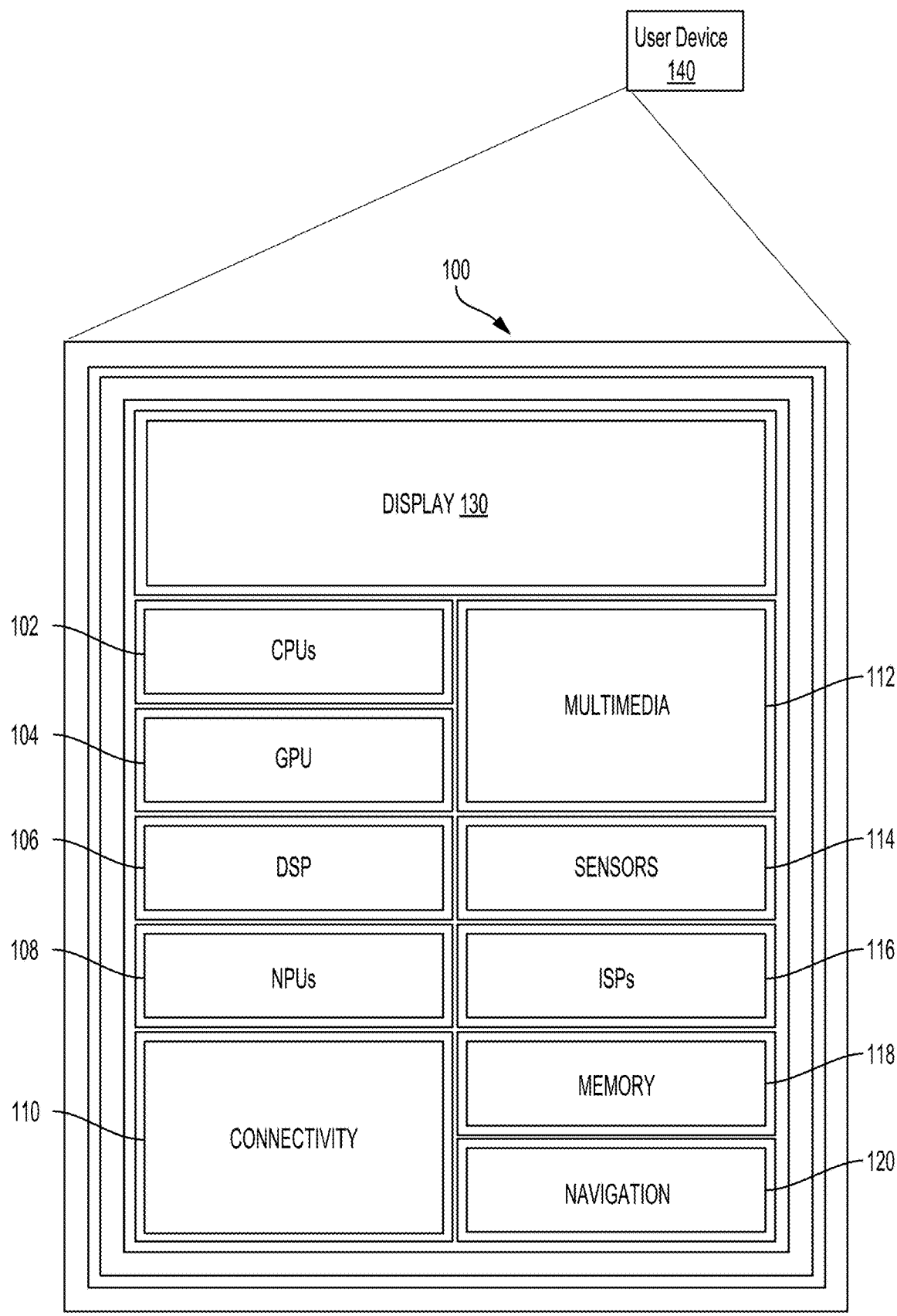
FIG. 1 illustrates an example implementation of designing a neural network by automating moodboard augmentation via cross-modal generative association making, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be universally applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Visual content creators may utilize image curation tools to provide an online platform for creating and highlighting their creative work. For example, image curation tools such as PINTEREST® and BEHANCE® are the de facto standard tools used by designers to inspire their work. Nevertheless, exploring a design space involves a manual and aimless process, which is not provided by these image creation tools. In practice, visual content creators first begin their creative process (e.g., concept sketches) by aimlessly searching or scrolling through images in diverse topics (e.g., fashion, architecture, product design, etc.). This searching/scrolling process is followed by iteratively narrowing down the topic, scope, and focus of the search as the visual content creators increase the fidelity of their designs.

In the image space, it is possible to avoid or prevent design fixation by reducing the relative saliency of each image or drawing attention away from any one image. Simultaneously creating multiple interpolations of existing curated images, that blend images at the pixel level, provides designers access to new ways of making associations across many diverse concepts. Similarly, creating multiple extrapolations of existing curated images allows one to expand the design space.

Presenting people with visual alternatives can enhance design creativity by allowing them to consider options that they may not have otherwise thought. In the text modality, concept graphs that depict semantic relationships adjacent to the core concept conveyed in each image could be projected and used as a basis to construct semantic or conceptual blends among two adjacent images. For instance, an image of an SUV with a ski rack could blend with an image of an icebox to generate a new image of an icebox with ski racks on top of the lid.

The above example illustrates a process that can be augmented using an artificial intelligence (AI) design assistant that is directed to stimulating a designer's creative ideation process by adding interactive and augmentative capabilities to an image-based digital moodboard interface. The proposed invention provides instantaneous and simultaneous intelligent text-based and image-based augmentations to an existing static image collage, which represents significant advantages over current commercially available moodboard technologies such as PINTEREST® as well as academic prototypes. One benefit and improvement over existing technologies is that the simultaneous presentation of moodboard augmentation helps the designer avoid design fixation. These aspects of the present disclosure beneficially improve the adoption of design creativity support tools within companies' design studios by presenting a way to tailor those tools towards designers and contexts.

FIG. 1 illustrates an example implementation of the aforementioned system and method for automated moodboard augmentation via cross-modal generative association making using a system-on-a-chip (SOC) 100, according to aspects of the present disclosure. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a control action, according to the display 130 illustrating a view of a user device.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risc Machine (ARM) instruction set, RISC-V, or any reduced instruction set computing (RISC) architecture, or the like. In another aspect of the present disclosure, the SOC 100 may be a server computer in communication with a user device 140. In this arrangement, the user device 140 may include a processor and other features of the SOC 100.

In this aspect of the present disclosure, instructions loaded into a processor (e.g., the CPU 102) or the NPU 108 may include code to provide a visual content design system for automated moodboard augmentation via cross-modal generative association making. The instructions loaded into a processor (e.g., the NPU 108) may also include code to specify, by a user, a region to augment in their digital workspace, including at least one selected image. The instructions loaded into the processor (e.g., the NPU 108) may also include code to infer a representative text, label or description for the selected image. The instructions loaded into the processor (e.g., the NPU 108) may also include code to create a basis for concept blending by segmenting different objects and scenery from the selected image based on the representative text, label, or description inferred for the selected image. The instructions loaded into the processor (e.g., the NPU 108) may also include code to generate images in response to an adjustable slider, as adjusted by the user, to adjust how much the generated images should resemble directly adjacent images, including the at least one selected image.

Figure 2:
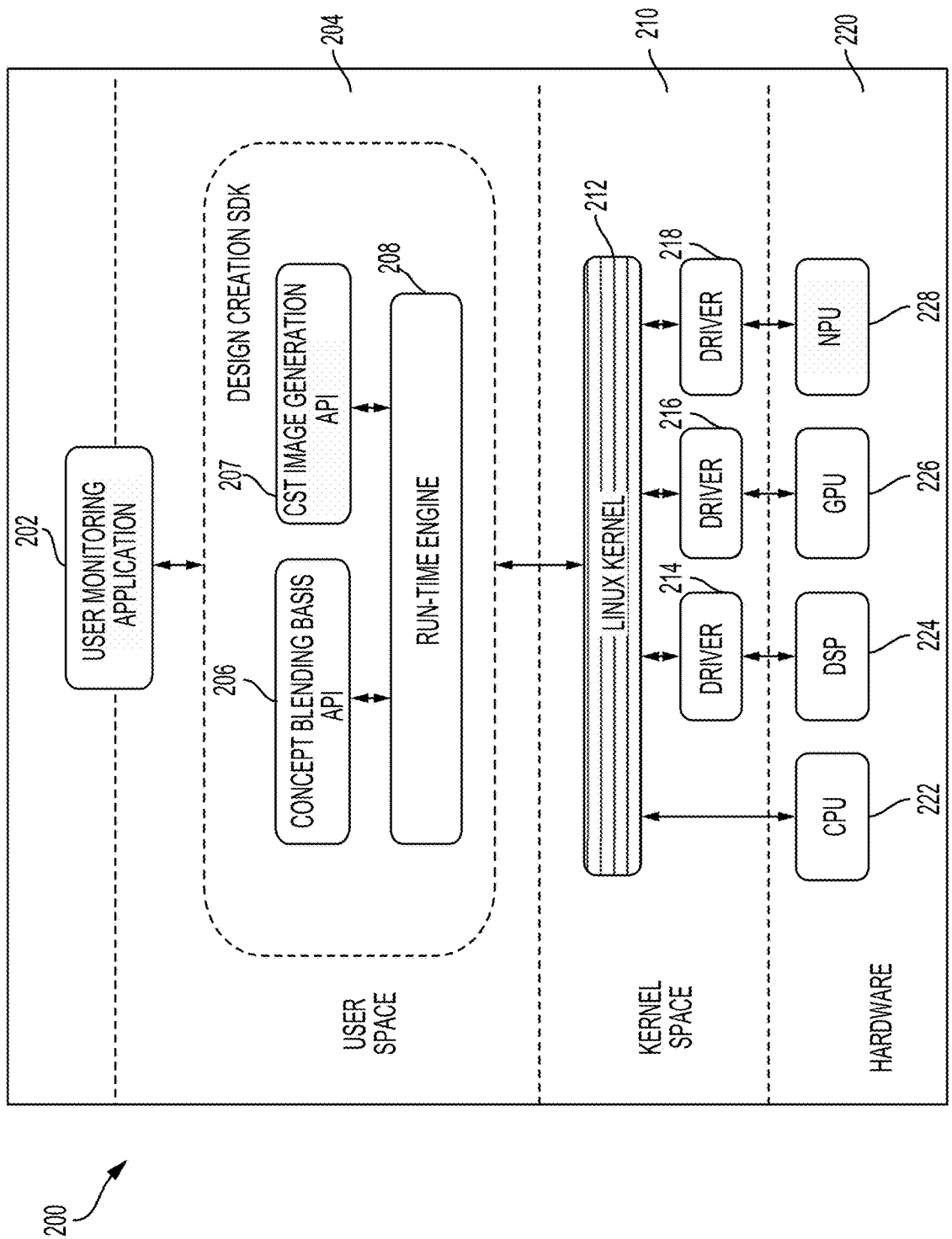
FIG. 2 is a block diagram illustrating an exemplary software architecture that may modularize artificial intelligence (AI) functions for automated moodboard augmentation via cross-modal generative association making, according to aspects of the present disclosure.

FIG. 2 is a block diagram illustrating a software architecture 200 that may modularize artificial intelligence (AI) functions for automated moodboard augmentation via cross-modal generative association making, according to aspects of the present disclosure. Using the architecture, a user monitoring application 202 may be designed such that it may cause various processing blocks of an SOC 220 (for example a CPU 222, a DSP 224, a GPU 226, and/or an NPU 228) to perform supporting computations during run-time operation of the user monitoring application 202. FIG. 2 describes the software architecture 200 for a visual content design system. It should be recognized that the visual content design system is not limited to any specific information. According to aspects of the present disclosure, the user monitoring and the visual content design functionality is applicable to any type of creativity support tool (CST).

The user monitoring application 202 may be configured to call functions defined in a user space 204 that may, for example, provide visual content design services. The user monitoring application 202 may make a request for compiled program code associated with a library defined in a concept blending basis application programming interface (API) 206. The concept blending basis API 206 is configured to infer a representative text, label, or description for a selected image by a user for a region to augment in their digital workspace. The concept blending basis API 206 is further configured to create a basis for concept blending by segmenting different objects and scenery from the selected image based on the representative text, label, or description inferred for the selected image.

In response, compiled program code of a CST image generation API 207 is configured to generate images in response to an adjustable slider, as adjusted by the user, to adjust how much the generated images should resemble directly adjacent images, including the at least one selected image. Additionally, the CST image generation API 207 is configured to display the generated images to the individual designer by providing interactive and augmentative capabilities to an image-based digital moodboard interface.

A run-time engine 208, which may be compiled code of a run-time framework, may be further accessible to the user monitoring application 202. The user monitoring application 202 may cause the run-time engine 208, for example, to take actions for recommendations of design alternatives to improve the design of visual content. In response to recommendation of visual content, the run-time engine 208 may in turn send a signal to an operating system 210, such as a Linux Kernel 212, running on the SOC 220. FIG. 2 illustrates the Linux Kernel 212 as software architecture for a visual content creation system. It should be recognized, however, that aspects of the present disclosure are not limited to this exemplary software architecture. For example, other kernels may provide the software architecture to support the visual content design functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228 if present.

As noted above, in the image space, it is possible to avoid or prevent design fixation by reducing the relative saliency of each image or drawing attention away from any one image. Simultaneously creating multiple interpolations of existing curated images, that blend images at the pixel level, provides designers access to new ways of making associations across many diverse concepts. Similarly, creating multiple extrapolations of existing curated images allows one to expand the design space. In particular, presenting people with visual alternatives can enhance design creativity by allowing them to consider options that they may not have otherwise thought. In the text modality, concept graphs that depict semantic relationships adjacent to the core concept conveyed in each image could be projected and used as a basis to construct semantic or conceptual blends among two adjacent images. For instance, an image of an SUV with a ski rack could blend with an image of an icebox to generate a new image of an icebox with ski racks on top of the lid.

Various aspects of the present disclosure provide instantaneous and simultaneous intelligent text-based and image-based augmentations to an existing static image collage, which represents significant advantages over current commercially available moodboard technologies such as PINTEREST® as well as academic prototypes. One benefit and improvement over existing technologies is the simultaneous presentation of moodboard augmentation, which helps the designer avoid design fixation. These aspects of the present disclosure beneficially improve the adoption of design creativity support tools within companies' design studios by presenting a way to tailor those tools towards designers and contexts, for example, as shown in FIG. 3.

Figure 3:
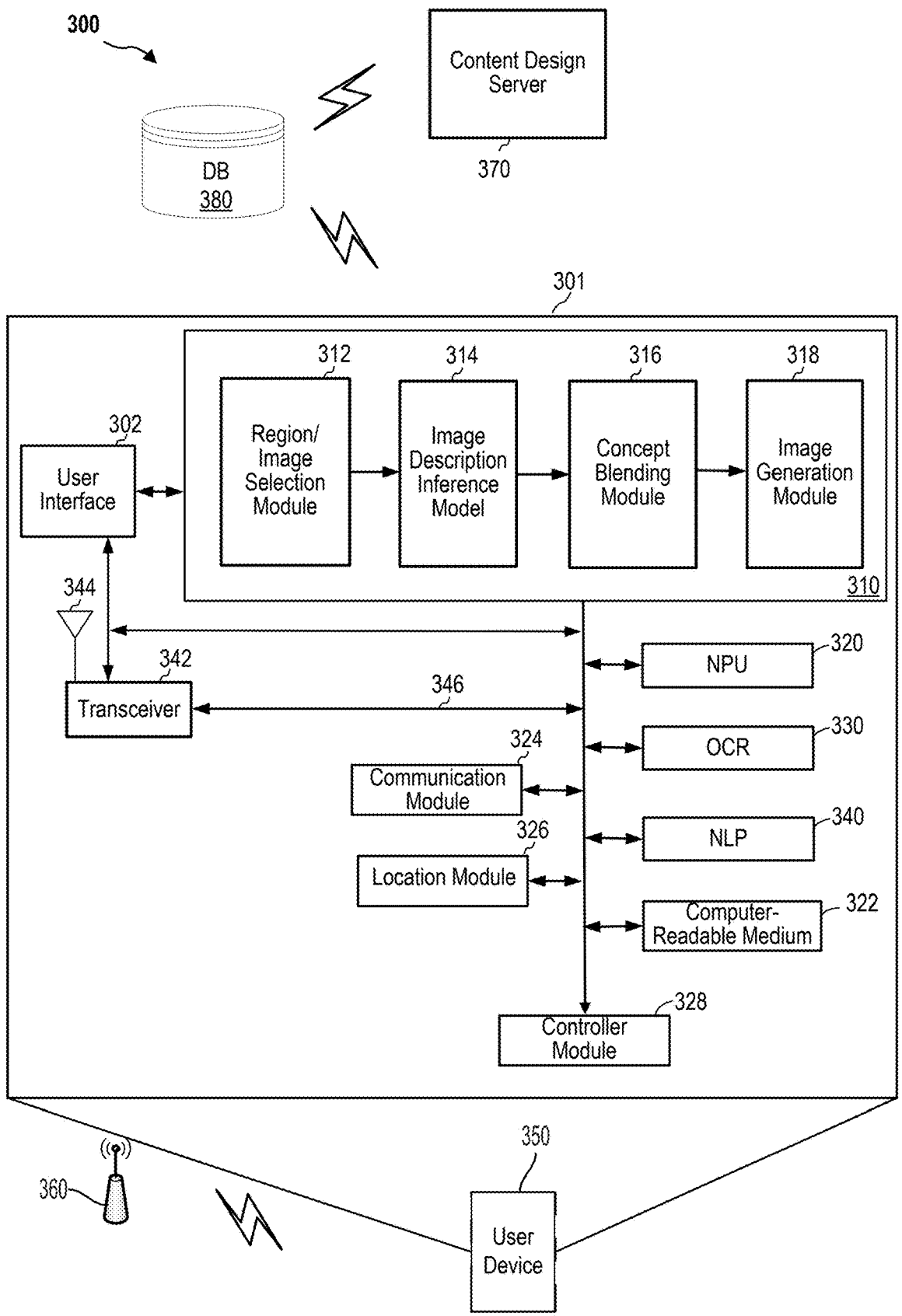
FIG. 3 is a diagram illustrating a hardware implementation for a visual content design system, according to aspects of the present disclosure.

FIG. 3 is a diagram illustrating a hardware implementation for a visual content design system 300, according to aspects of the present disclosure. The visual content design system 300 provides an enhanced creativity support tool (CST) that supports simultaneous intelligent text-based and image-based augmentations to an existing static image collage, which represents significant advantages over current commercially available moodboard technologies such as PINTEREST® as well as academic prototypes. The visual content design system 300 generates images in response to an adjustable slider, as adjusted by the user, to adjust how much the generated images should resemble directly adjacent images, including the at least one selected image.

Additionally, the visual content design system 300 is configured to display the generated images to the individual designer using interactive and augmentative capabilities of an image-based digital moodboard interface.

The visual content design system 300 includes a user monitoring system 301 and a visual content design server 370 in this aspect of the present disclosure. The user monitoring system 301 may be a component of a user device 350. The user device 350 may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a Smartbook, an Ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a global positioning system device, or any other suitable device that is configured to communicate via a wireless or wired medium.

The visual content design server 370 may connect to the user device 350 to provide an enhanced creativity support tool (CST) that supports simultaneous intelligent text-based and image-based augmentations to an existing static image collage, which represents significant advantages over current commercially available moodboard technologies such as PINTEREST® as well as academic prototypes. The visual content design server 370 generates images in response to an adjustable slider, as adjusted by the user, to adjust how much the generated images should resemble directly adjacent images, including the at least one selected image. Additionally, the visual content design server 370 directs the user device 350 to display the generated images to the individual designer using interactive and augmentative capabilities of an image-based digital moodboard interface.

The user monitoring system 301 may be implemented with an interconnected architecture, represented by an interconnect 346, which may be implemented as a controller area network (CAN). The interconnect 346 may include any number of point-to-point interconnects, buses, and/or bridges depending on the specific application of the user monitoring system 301 and the overall design constraints. The interconnect 346 links together various circuits including one or more processors and/or hardware modules, represented by a user interface 302, a user activity module 310, a neural network processor (NPU) 320, a computer-readable medium 322, a communication module 324, a location module 326, a controller module 328, an optical character recognition (OCR) 330, and a natural language processor (NLP) 340. The interconnect 346 may also link various other circuits such as timing sources, peripherals, voltage regulators, and power management circuits, which are well known in the art, and therefore, will not be described any further.

The user monitoring system 301 includes a transceiver 342 coupled to the user interface 302, the user activity module 310, the NPU 320, the computer-readable medium 322, the communication module 324, the location module 326, the controller module 328, the OCR 330, and NLP 340. The transceiver 342 is coupled to an antenna 344. The transceiver 342 communicates with various other devices over a transmission medium. For example, the transceiver 342 may receive commands via transmissions from a user. In this example, the transceiver 342 may receive/transmit information for the user activity module 310 to/from connected devices within the vicinity of the user device 350.

The user monitoring system 301 includes the NPU 320, the OCR 330, and the NLP 340 coupled to the computer-readable medium 322. The NPU 320, the OCR 330, and NLP 340 performs processing, including the execution of software stored on the computer-readable medium 322 to provide a neural network model for user monitoring and statistical data clarification functionality according to the present disclosure. The software, when executed by the NPU 320, the OCR 330 and the NLP 340, causes the user monitoring system 301 to perform the various functions described for presenting analogies to clarify statistical data presented to the user through the user device 350, or any of the modules (e.g., 310, 324, 326, and/or 328). The computer-readable medium 322 may also be used for storing data that is manipulated by the OCR 330 and the NLP 340 when executing the software to analyze user communications.

The location module 326 may determine a location of the user device 350. For example, the location module 326 may use a global positioning system (GPS) to determine the location of the user device 350. The location module 326 may implement a dedicated short-range communication (DSRC)-compliant GPS unit. A DSRC-compliant GPS unit includes hardware and software to make the user device 350 and/or the location module 326 compliant with the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the user device 350 that are not modules of the user monitoring system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The user monitoring system 301 also includes the OCR 330 and the NLP 340 to automatically detect multiple objects in an image displayed on the user's workspace. The user monitoring system 301 may follow a process to detect and determine whether the user accesses creative content. When the user curates images, the user monitoring system 301 utilizes the OCR 330 and/or the NLP 340 to analyze designs of detected objects in the image displayed on the user's workspace.

The user activity module 310 may be in communication with the user interface 302, the NPU 320, the computer-readable medium 322, the communication module 324, the location module 326, the controller module 328, the OCR 330, the NLP 340, and the transceiver 342. In one configuration, the user activity module 310 monitors communications from the user interface 302. The user interface 302 may monitor user communications to and from the communication module 324. According to aspects of the present disclosure, the OCR 330 and the NLP 340 automatically detect images displayed on the user's workspace and may use computer vision object detection and instance segmentation techniques to automatically detect the objects in the image to enable design action pattern analysis to enable determination of design alternatives for a user.

As shown in FIG. 3, the user activity module 310 includes a region/image selection module 312, an image description inference model 314, a concept blending module 316, and an image generation module 318. The region/image selection module 312, the image description inference model 314, the concept blending module 316, and the image generation module 318 may be components of a same or different artificial neural network, such as a deep convolutional neural network (CNN). The user activity module 310 is not limited to a CNN. The user activity module 310 monitors and analyzes designs displayed on the user's workspace from the user interface 302.

This configuration of the user activity module 310 includes the region/image selection module 312 configured to receive a region selected by the user to augment in their digital workspace, including at least one selected image by a user selection. In various aspects of the present disclosure, the region/image selection module 312 is implemented as an image group (e.g., moodboard) specification module that allows a user to specify a region to augment in their digital workspace. For example, the specified region is expected to include a collage of images. Alternatively, users could directly provide moodboard images to a dedicated web user interface, such as the visual content design server 370. In various aspects of the present disclosure, an edge detection algorithm can be used to detect a grid of images on any part of the user's workspace, which is highlighted for the user to confirm their choice of images with which to work. For example, the edge detection algorithm may be implemented using use the OCR 330 and the NLP 340 to identify a grid of images on any part of the user's workspace.

In various aspects of the present disclosure, the user activity module 310 includes the image description inference model 314 configured to infer a representative text, label, or description for the selected image. The image description inference model 314 infers a representative text, label, or description for a given image selected by the user. This inference of the text, label, or description for a given image based on text-image joint embedding using a model (e.g., Open AI's CLIP). In some aspects of the present disclosure, the image description inference model 314 is implemented using an image concept graph generation module. In this configuration, the generated text descriptions from image description inference model 314 are used for creating concept graphs that show semantic relationships among concepts related to the image.

In this example, the user activity module 310 also includes the concept blending module 316 configured to create a basis for concept blending by segmenting different objects and scenery from the selected image. In various aspects of the present disclosure, the concept blending module 316 is implemented using an image segmentation module. For example, the image segmentation module segments different objects and scenery from the image, creating the basis for concept blending in the concept blending module 316. The instance segmentation module may be implemented using computer vision-based object detection and instance segmentation and/or a natural language processor.

Figure 4:
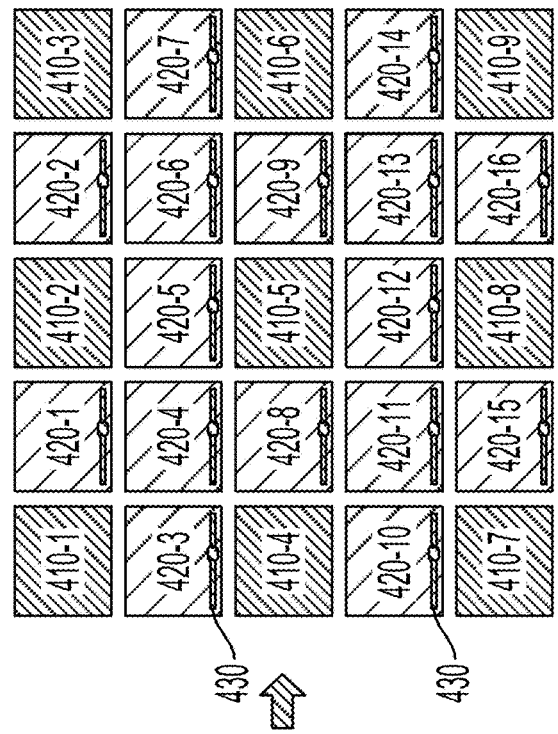
FIG. 4 is a diagram illustrating a moodboard augmented via image interpolation, according to various aspects of the present disclosure.
Figure 4:
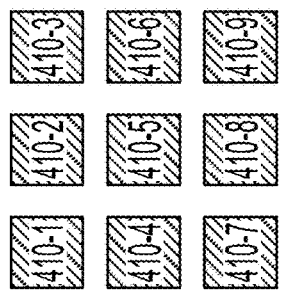
Figure 5:
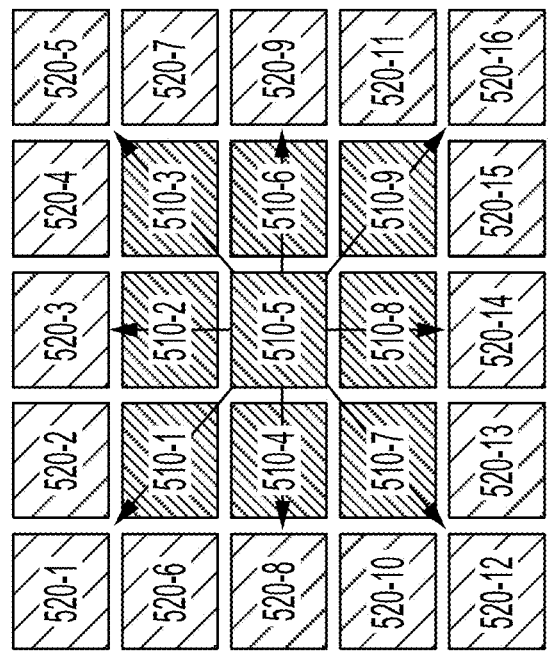
FIG. 5 is a diagram illustrating a moodboard augmented via image extrapolation, according to various aspects of the present disclosure.
Figure 7:
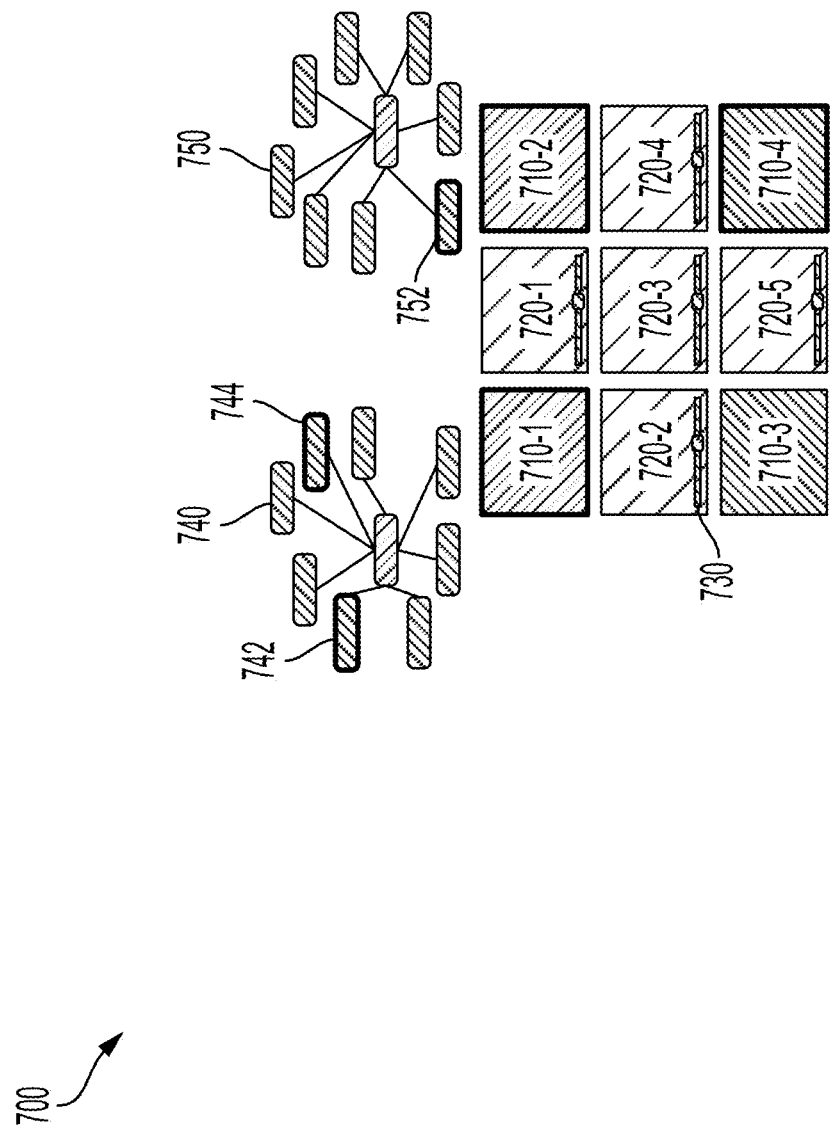
FIG. 7 is a diagram illustrating a blended image generated via concept blending, according to various aspects of the present disclosure.

As shown in FIG. 3, the user activity module 310 includes the image generation module 318 configured to generate images in response to an adjustable slider, as adjusted by the user, to adjust how much the generated images should resemble directly adjacent images, including the at least one selected image. According to various aspects of the present disclosure, images are generated by either interpolating images at the pixel level or conceptual blending with semantic visual elements among adjacent images in an image collage, for example, as shown in FIG. 4. Alternatively, images are generated by the image generation module 318 via extrapolation, for example, as shown in FIG. 5. In other aspects of the present disclosure, images are generated by the image generation module 318 via concept blending, for example, as shown in FIG. 7.

In other aspects of the present disclosure, the image generation module 318 is implemented as a random remix module. Besides having control over the image generation via sliders and concept graphs, users can also command serendipitous inspiration by deferring some control to the AI to suggest random ways for creating images via a combination of interpolation and concept blending. Moreover, hitting refresh continues to leverage AI's non-deterministic approach to generate new alternative combinations. This also includes switching the position and orientation of images.

In some aspects of the present disclosure, the user activity module 310 may be implemented and/or work in conjunction with the visual content design server 370. In one configuration, a database (DB) 380 enables deferring some control to the AI for suggesting random ways to generate images via both interpolation and concept blends, which may be displayed as output through the user interface 302. In some aspects of the present disclosure, the visual content design system 300 may be implemented as a web browser plugin. In other aspects of the present disclosure, the visual content design server 370 provides an offline application that scans content viewed through the user interface 302. In other aspects of the present disclosure, the visual content design system 300 may be implemented as a mobile application that augments the visual content design process by recommending design alternatives through the user interface 302.

Figure 6:
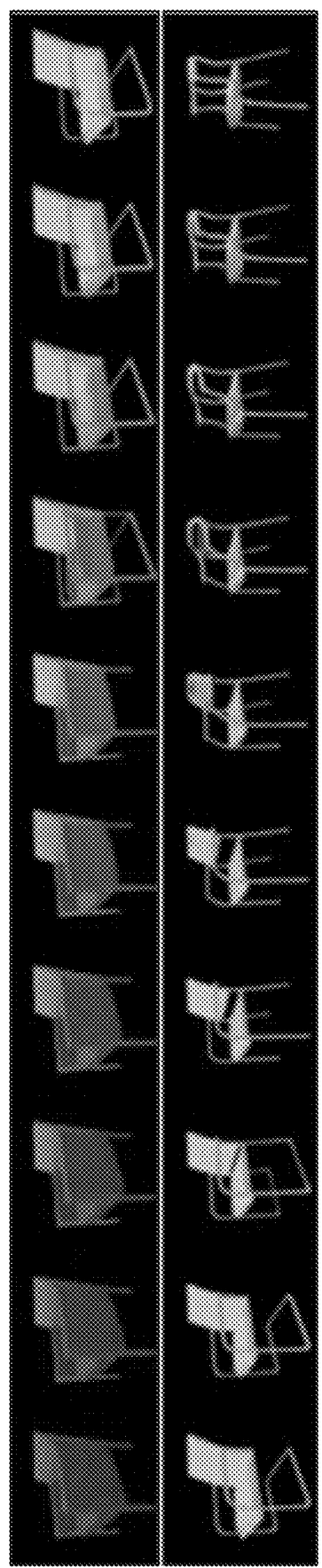
FIG. 6 is a diagram illustrating a linear interpolation between two objects, according to various aspects of the present disclosure.

FIG. 4 is a diagram illustrating a 3×3 moodboard augmented via image interpolation, according to various aspects of the present disclosure. As shown in FIG. 4, newly generated images 420 (420-1, 420-2, . . . , 420-16) via interpolation fill gaps among original images 410 (410-1, 410-2, . . . , 410-8). In various aspects of the present disclosure, sliders 430 allow users to adjust how much the newly generated images 420 should resemble directly adjacent, original images 410. For example, sliding to the left indicates more visual representation from the left image vs. the one on the right. Further examples of image interpolation are shown, for example, in FIG. 6 below. In particular, FIG. 6 is a diagram illustrating a linear interpolation 600 between two objects (e.g., chairs), according to various aspects of the present disclosure.

FIG. 5 is a diagram illustrating a 3×3 moodboard augmented via image extrapolation, according to various aspects of the present disclosure. As shown in FIG. 5, newly generated images 520 (520-1, 520-2, . . . , 520-16) via extrapolation of outer ones of the original images 510 (510-1, 510-2, . . . , 510-8) show possible ways of expanding the moodboard. For instance, an out-painting feature of diffusion based generative AI models could depict additional context that is relevant to the concepts in the original images 510 of the moodboard in expected and unexpected ways. For example, using a prompt engineering field that allow users to have control over the extrapolation is also contemplated according to various aspects of the present disclosure.

FIG. 7 is a diagram illustrating a blended image 700 generated via concept blending, according to various aspects of the present disclosure. As shown in FIG. 7, new images 720 (720-1, 720-2, 720-3, 720-4, 720-5) can also be generated via concept blending, where projected concept graphs 740, 750 derived from image descriptions in the image description inference model 314 of FIG. 3 use an image concept graph generation module to provide the basis for switching design elements. In various aspects of the present disclosure, the projected concept graphs 740, 750 illustrate a semantic relationship among concepts related to the new images 720. Additionally, image segmentation helps support conceptual blending in ways that preserve original visual elements 710 (710-1, 710-1, 710-3, 710-4) and resolution with the exception of those that are switched.

As shown in FIG. 7, designers have the option to edit and control which semantic visual elements are to be switched to create the blended image 700. For instance, selecting and deselecting concepts (e.g., 742, 744/752) in the projected concept graphs 740, 750 allows the user to choose which semantically distinct visual elements to transfer to the adjacent image. In the conceptual blending mode, the slider user interface 730 can be used to change the number of visual elements that are transferred across from either of the two images. For example, sliding toward the left indicates more visual elements taken from the left image will be reflected on the resulting generated image.

Figure 8:
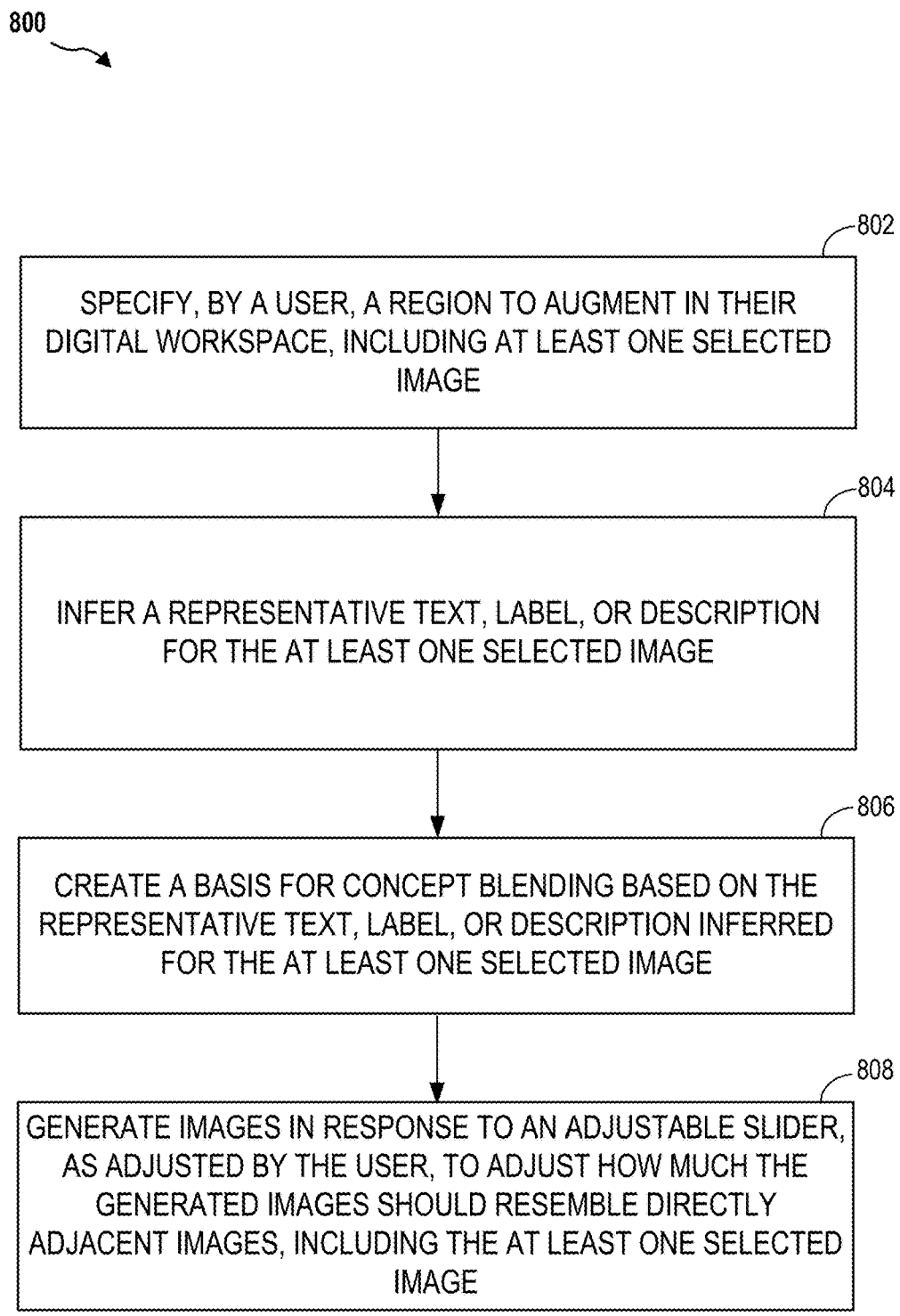
FIG. 8 is a process flow diagram illustrating a method for automated moodboard augmentation via cross-modal generative association making, according to various aspects of the present disclosure.

FIG. 8 is a process flow diagram illustrating a method 800 for automated moodboard augmentation via cross-modal generative association making, according to various aspects of the present disclosure. The method 800 begins at block 802, in which a region to augment is specified by a user in their digital workspace, including at least one selected image. For example, as shown in FIG. 3, the region/image selection module 312 is configured to receive a region selected by the user to augment in their digital workspace, including at least one selected image by a user selection. In various aspects of the present disclosure, the region/image selection module 312 is implemented as an image group (e.g., moodboard) specification module that allows a user to specify a region to augment in their digital workspace. For example, the specified region is expected to include a collage of images. Alternatively, users could directly provide moodboard images to a dedicated web user interface, such as the visual content design server 370.

At block 804, a representative text, label, or description is inferred for the at least one selected image. For example, as shown in FIG. 3, the image description inference model 314 configured to infer a representative text, label, or description for the selected image. The image description inference model 314 infers a representative text, label, or description for a given image selected by the user. This inference of the text, label, or description for a given image based on text-image joint embedding using a model (e.g., Open AI's CLIP). In some aspects of the present disclosure, the image description inference model 314 is implemented using an image concept graph generation module. In this configuration, the generated text descriptions from image description inference model 314 are used for creating concept graphs that show semantic relationships among concepts related to the image.

At block 806, a basis for concept blending is created based on the representative text, label, or description inferred for the at least one selected image. For example, as shown in FIG. 3, the concept blending module 316 configured to create a basis for concept blending by segmenting different objects and scenery from the selected image. In various aspects of the present disclosure, the concept blending module 316 is implemented using an image segmentation module. For example, the image segmentation module segments different objects and scenery from the image, creating the basis for concept blending in the concept blending module 316. The instance segmentation module may be implemented using computer vision-based object detection and instance segmentation and/or a natural language processor.

At block 808, images are generated in response to an adjustable slider, as adjusted by the user, to adjust how much the generated images should resemble directly adjacent images, including the at least one selected image. For example, as shown in FIG. 3, the image generation module 318 configured to generate images in response to an adjustable slider, as adjusted by the user, to adjust how much the generated images should resemble directly adjacent images, including the at least one selected image. According to various aspects of the present disclosure, images are generated by either interpolating images at the pixel level or conceptual blending with semantic visual elements among adjacent images in an image collage, for example, as shown in FIG. 4. Alternatively, images are generated by the image generation module 318 via extrapolation, for example, as shown in FIG. 5. In other aspects of the present disclosure, images are generated by the image generation module 318 via concept blending, for example, as shown in FIG. 7.

The various operations of methods described above may be performed by any suitable means capable of performing the corresponding functions. The means may include various hardware and/or software component(s) and/or module (s), including, but not limited to, a circuit, an application-specific integrated circuit (ASIC), or processor. Where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in several ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for automated moodboard augmentation via cross-modal generative association making, comprising:
   specifying, by a user, a region to augment in their digital workspace, including at least one selected image;
   inferring a representative text, label, or description for the at least one selected image;
   creating a basis for concept blending based on the representative text, label, or description inferred for the at least one selected image; and
   generating images in response to an adjustable slider, as adjusted by the user, to adjust how much the generated images should resemble directly adjacent images, including the at least one selected image.

2. The method of claim 1, in which creating the basis for concept blending further comprises segmenting different objects and scenery from the at least one selected image based on the representative text, label, or description inferred for the at least one selected image to create the basis for concept blending.

3. The method of claim 1, in which inferring comprises generating a text-image joint embedding using an image description inference model.

4. The method of claim 1, in which specifying comprises:
   detecting a grid of images on the digital workspace;
   highlighting the detected grid of images; and
   confirming a user selection of the at least one selected image from the detected grid of images.

5. The method of claim 1, in which the generating images further comprises displaying, through a user interface, a collage of images generated via image interpolation from the at least one selected image.

6. The method of claim 1, in which the generating images further comprises displaying, through a user interface, a collage of images generated via image extrapolation from the at least one selected image.

7. The method of claim 1, further comprising creating concept graphs illustrating a semantic relationship among concepts related to the at least one selected image.

8. The method of claim 1, further comprising creating images via a combination of interpolation and concept blending.

9. A non-transitory computer-readable medium having program code recorded thereon for automated moodboard augmentation via cross-modal generative association making, program code being executed by a processor and comprising:
   program code to specify, by a user, a region to augment in their digital workspace, including at least one selected image;
   program code to infer a representative text, label, or description for the at least one selected image;
   program code to create a basis for concept blending based on the representative text, label, or description inferred for the at least one selected image; and
   program code to generate images in response to an adjustable slider, as adjusted by the user, to adjust how much the generated images should resemble directly adjacent images, including the at least one selected image.

10. The non-transitory computer-readable medium of claim 9, in which the program code to create the basis for concept blending is further to segment different objects and scenery from the at least one selected image based on the representative text, label, or description inferred for the at least one selected image to create the basis for concept blending.

11. The non-transitory computer-readable medium of claim 9, in which the program code to infer comprises program code to generate a text-image joint embedding using an image description inference model.

12. The non-transitory computer-readable medium of claim 9, in which the program code to specify comprises:
   program code to detect a grid of images on the digital workspace;
   program code to highlight the detected grid of images; and
   program code to confirm a user selection of the at least one selected image from the detected grid of images.

13. The non-transitory computer-readable medium of claim 9, in which the program code to generate images further comprises program code to display, through a user interface, a collage of images generated via image interpolation from the at least one selected image.

14. The non-transitory computer-readable medium of claim 9, in which the program code to generate images further comprises program code to display, through a user interface, a collage of images generated via image extrapolation from the at least one selected image.

15. The non-transitory computer-readable medium of claim 9, further comprising program code to create concept graphs illustrating a semantic relationship among concepts related to the at least one selected image.

16. The non-transitory computer-readable medium of claim 9, further comprising program code to create images via a combination of interpolation and concept blending.

17. A system for automated moodboard augmentation via cross-modal generative association making, the system comprising:

a region/image selection module to specify, by a user, a region to augment in their digital workspace, including at least one selected image;

an image description inference model to infer a representative text, label, or description for the at least one selected image;

a concept blending module to create a basis for concept blending based on the representative text, label, or description inferred for the at least one selected image; and an image generation module to generate images in response to an adjustable slider, as adjusted by the user, to adjust how much the generated images should resemble directly adjacent images, including the at least one selected image.

18. The system of claim 17, in which the concept blending module is further to segment different objects and scenery from the at least one selected image based on the representative text, label, or description inferred for the at least one selected image to create the basis for concept blending.

19. The system of claim 17, in which the image generation module is further to display, through a user interface, a collage of images generated via image interpolation from the at least one selected image.

20. The system of claim 17, in which the image generation module is further to display, through a user interface, a collage of images generated via image extrapolation from the at least one selected image.

\* \* \* \* \*